C. C. ALLEN.
GAUGE.
APPLICATION FILED JULY 22, 1920.
1,419,004. Patented June 6, 1922.
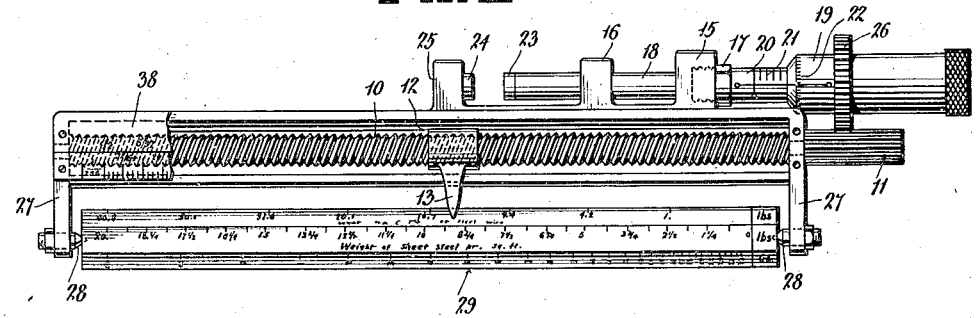
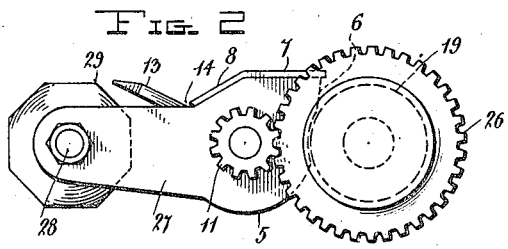
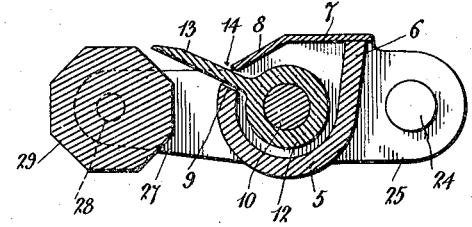
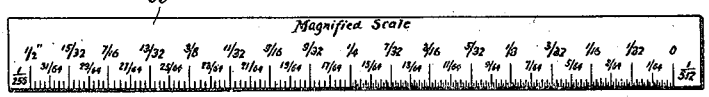
Inventor
Charles C. Allen,
Witnesses

UNITED STATES PATENT OFFICE.

CHARLES C. ALLEN, OF INDIANOLA, NEBRASKA.

GAUGE.

1,419,004.

Specification of Letters Patent. Patented June 6, 1922.

Application filed July 22, 1920. Serial No. 398,093.

*To all whom it may concern:*

Be it known that I, CHARLES C. ALLEN, a citizen of the United States, residing at Indianola, in the county of Redwillow and State of Nebraska, have invented new and useful Improvements in Gauges, of which the following is a specification.

This invention relates to a gauge which embodies the usual type of micrometer and in addition has means for readily determining the weight and gauge of different makes of wire, sheet metal and analogous products.

In construction work involving metal products it sometimes happens that material is at hand which cannot be determined as to its make or what it weighs by the gauges now in use. By means of the improved gauge forming the subject matter of the present invention, material of the character specified may be positively tested and its make distinguished whether said product be sheet metal or wire, and by using the improved gauge therewith the make of the metal product on hand may be easily ascertained as well as the weight thereof per square foot, and by comparison with other standard gauges on the market, the user of the improved measuring gauge may quickly learn whether he is working heavy or light material and whether or not the material is of the kind ordered.

The primary object of the invention, therefore, is to provide a simple and compact form of comparative gauge comprising means for ascertaining with accuracy the weight of wire or sheet steel or metal as well as the thickness of such products and whether or not the latter measure up to the requisites of a predetermined specification governing the work to be performed; and also to provide a gauge capable of use as a measuring device in shops for determining the sizes of drills, thread cutters and other similar tools that may be required for boring openings and forming threads for bolts of various types, machine screws, cap and set screws and other like devices.

The invention consists in the construction and arrangement of the several parts which will be more fully hereinafter described and claimed.

In the drawing:

Fig. 1 is a side elevation, partially broken away, of a gauge embodying the features of the invention.

Fig. 2 is an end elevation of the gauge.

Fig. 3 is a transverse vertical section of the same.

Fig. 4 illustrates diagrammatic views of devices carrying various scales used with the improved gauge.

The numeral 5 designates a screw box of suitable length and having one side 6 thereof projected above the free edge of the remaining side, and on the upper edge of the said projected side 6 a flat cover 7 is secured and has an inwardly inclined magnified scale-bearing or carrying means 8, the said magnified scale-bearing means preferably forming an integral part of the cover and extending towards the upper edge 9 of the screw box, as clearly shown by Fig. 3. Rotatably mounted in the box 5 is a screw-threaded spindle 10 extending the full length of the box and provided at one end, exterior of the box, with an elongated gear 11. Shiftably mounted and automatically movable on the screw spindle 10 is a nut 12 having an indicating pointer 13 extending therefrom through the opening as at 14 between the free edge of the magnified scale-bearing means or member 8 and the edge 9 of the box 5. Bearing devices 15 and 16 project from the side 6 of the box 5, the bearing 15 also having a screw nut 17 engaging the same and forming a part of the micrometer stem 18, the stem 18 being connected to a thumb piece or actuating means 19 having a reduced inner extremity 20, scales 21 and 22 being formed on the said extremity and the adjacent enlarged part of the thumb piece. The inner end or terminal of the stem 18 has a hardened metal tip 23 secured thereon and in longitudinal alinement with a cooperating similar tip 24 held by a projecting lug or boss 25 also extending from the side 6 of the screw box 5 at a suitable distance inwardly from the bearing 16.

The operation of the micrometer gauge above described will be understood as it is a device commonly known in the art.

On the thumb piece or actuating means 19 of the micrometer gauge is a gear 26 which is held in continual mesh with the gear 11, and by rotating the said thumb piece or actuating means 19 the screw spindle 10 will be rotated and the screw nut 12 with its indicating pointer 13 actuated or caused to move forwardly or rearwardly on the said spindle. Projecting from the ends of the screw box or enclosure 5 are arms 27 having in their free extremities inwardly projecting adjustably and removably mounted center screws 28 which are adapted to engage the centers of the opposite ends of an octagonal indicator or indicating scale cylinder 29 adapted to be replaced by a similar cylinder, or a number of these cylinders will be provided as a part of the equipment of the improved gauge, and whereby the said gauge may be practically used for ascertaining measurements of various devices, not only including wire and sheet metal, but bolts, nuts and screws of different kinds to determine the size of the drill or threading means necessary for boring openings to receive such screws and other analogous devices. The cylinder 29 on its several faces will bear the scales 30, 31, 32, 33, 34, 35, 36 and 37 and will be manually turned to bring anyone of these latter scales into position when it is desired to obtain the information as to weight and gauge of the various kinds and makes of material indicated on the said scales 30 to 37, inclusive, and by means of which quantities of these various makes of materials may be readily ascertained relatively to work to be performed. The magnified scale 38 shown by Fig. 4 is applied to the indicating pointer 13 of the nut 12. The improved gauge also enables a builder or contractor to determine with certainty if the material he has in hand or has procured in bulk is what it purports to be and also if the material to be used complies with the necessary weight per square foot in accordance with predetermined specifications and calculations.

It will be understood that to ascertain the measurements desired with respect to material, or to test materials and measure the size of bolts, cap screws, set screws and the like, the material and latter devices are introduced between the points 23 and 24, the adjustment of the stem 18 being accomplished through the rotation of the thumb piece or actuating means 19, which may be first turned in one direction to form a space of suitable dimensions between the said points 23 and 24 and subsequently turned in a reverse direction to effect a positive bearing or contact of the points with the material at diametrically opposite portions thereof. During the operation of the thumb piece or actuating means 19 to bring the points 23 and 24 in positive engagement with the material or device to be measured or tested, the gears 26 and 11 will be similarly operated and the screw spindle 18 rotated and cause a shifting movement of the nut 12 and pointer 13, and by manually turning the cylinder 29 to bring the proper scale on the cylinder in cooperative position relatively to the said pointer the measurement or weight may be readily determined, the thumb piece 29 being operated by one hand and the cylinder 19 with the remaining hand.

All of the readings or scale information are effected through the medium of the screw nut 12 and its arm or pointer 13 at various lengths along the scale cylinder 29, except for one-thousandth part of an inch which is read at the thumb piece of the micrometer part of the gauge. The gears 26 and 11 are preferably in the proportion of three to one, and the screw spindle has a special double thread construction with six threads per inch and split with the second thread of six threads per inch, which makes the nut 12 travel fast over the screw spindle and rapidly shift the pointer or indicator 13 in opposite directions.

All the cylinder graduations are magnified similar to the magnified scale 38 to render easy the reading of these several scales. The improved gauge will also be made in several sizes to adapt it for use with structural steel I-beams, angle and channel irons, or analogous structural material, and is so prepared as to give thickness of webs, weight per foot and size and number of rivets that may be required under certain structural conditions. In other words, it is proposed to modify the scales of the cylinder 29 as may be found necessary or desirable to adapt the same for different structural materials.

What is claimed as new is:

1. In a gauge of the class specified, the combination of a micrometer gauge comprising contact means adjustably disposed for engaging opposite portions of different products and devices, an indicator bearing scales representing the kind, weight in pounds and gauge of products tested and shiftable to bring varying scales into operative position, and a pointer longitudinally movable over said indicator simultaneously by and with the actuation of the micrometer to designate the kind, weight and gauge of the products.

2. In a gauge of the class specified, the combination of a micrometer gauge including adjustable contact means to engage opposite portions of material or devices, a manually rotatable indicator cylinder having faces bearing differing scale means designating weight and gauge of various materials, and means actuated by the operation of the micrometer gauge for simultaneously designating on the said indicator cylinder the weight or gauge of the material tested between the said contact means and longitudinally movable over the cylinder in proportion to the adjustment of the contact means.

3. In a gauge of the class specified, the combination of a micrometer gauge including contact points disposed for relative adjustment, a screw spindle having a gear at one end and provided with a nut and pointer shiftable thereon, gear means carried by part of the micrometer gauge operatively meshing with the gear of the said spindle, and a rotatable cylinder having scales thereon indicating the weight and gauge of various materials and disposable for indication by the said pointer of the weight and kind of material tested between the said contact points.

4. In a gauge of the class specified, a micrometer gauge including relatively adjustable contact devices for engaging opposite portions of materials and devices to be measured, an indicator bearing scales representing the weight in pounds and gauge of various products, means actuated by the micrometer gauge for designating on the indicator gauge the result of the test of the material between the contact devices, and a magnified scale carried by a part of the gauge.

5. In a gauge of the class specified, the combination of a screw box, a micrometer gauge supported by the said box and with the latter having relatively adjustable contact points for engagement with opposite portions of material and devices to be tested, a screw spindle rotatably mounted in the said screw box and having a gear at one end exterior of the box and also provided with a screw nut and pointer freely shiftable thereon in opposite directions, a magnified scale plate on the top of the screw box and projecting inwardly for cooperation therewith of the said pointer, a gear carried by a part of the micrometer gauge and engaging the gear of the screw spindle, and a rotatable cylinder supported by the screw box and having scales thereon relating to different kinds of materials to designate weight and gauge of such material.

In testimony whereof I have hereunto set my hand in presence of two subscribing witnesses.

CHARLES C. ALLEN.

Witnesses:
C. L. HARDY,
D. E. GALLATIN.